(12) United States Patent
Wisniowski et al.

(10) Patent No.: US 10,514,697 B2
(45) Date of Patent: Dec. 24, 2019

(54) VEHICLE REMOTE ASSISTANCE MODE

(71) Applicant: GM GLOBAL TECHNOLOGY OPERATIONS LLC, Detroit, MI (US)

(72) Inventors: Matthias Wisniowski, San Francisco, CA (US); Drew Gross, San Francisco, CA (US); Solomon Bier, San Francisco, CA (US); Ian Rust, San Francisco, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 155 days.

(21) Appl. No.: 15/706,113

(22) Filed: Sep. 15, 2017

(65) Prior Publication Data

US 2018/0004214 A1 Jan. 4, 2018

(51) Int. Cl.
*G05D 1/02* (2006.01)
*G05D 1/00* (2006.01)
(Continued)

(52) U.S. Cl.
CPC .......... *G05D 1/0214* (2013.01); *B60K 35/00* (2013.01); *G01C 21/20* (2013.01); *G01C 21/3415* (2013.01); *G01C 21/3461* (2013.01); *G01C 21/3694* (2013.01); *G05D 1/0011* (2013.01); *G05D 1/0027* (2013.01); *G05D 1/0231* (2013.01); *G08G 1/09675* (2013.01); *G08G 1/096725* (2013.01); *G08G 1/096741* (2013.01); *G08G 1/096775* (2013.01); *G08G 1/096783* (2013.01); *G08G 1/096827* (2013.01); *G08G 1/096844* (2013.01); *G08G 1/164* (2013.01); *G08G 1/202* (2013.01); *B60W 2550/402* (2013.01); *G05D 2201/0213* (2013.01)

(58) Field of Classification Search
CPC ..................................................... G05D 1/0214
See application file for complete search history.

(56) References Cited

U.S. PATENT DOCUMENTS 8,467,961 B2 * 6/2013 Obradovich ....... G01C 21/3461
701/425
8,577,538 B2 * 11/2013 Lenser ................. G05D 1/0274
701/2

(Continued)

*Primary Examiner* — Hussein Elchanti
*Assistant Examiner* — Michael A Berns
(74) *Attorney, Agent, or Firm* — Lorenz & Kopf, LLP

(57) ABSTRACT

Systems and method are provided for controlling a vehicle. In one embodiment, a method includes calculating, via a router of a vehicle system that accesses road map data, at least one route to a destination based on the road map data, thereby producing route solution data. The vehicle system enters a remote assistance mode in response to remote assistance decision data received from a blockage arbiter of the vehicle system. In the remote assistance mode, the method includes determining, via the router, at least one road segment of the road map data that is permitted to be blacklisted, thereby producing permitted blacklist data. The method includes transmitting the permitted blacklist data and the route solution data, via a vehicle communications module of the vehicle system, to a remote vehicle assistance system. The method includes updating, via the router, the road map data to exclude at least one blacklisted road segment defined by the permitted blacklist data.

19 Claims, 5 Drawing Sheets

(51) Int. Cl.
*G01C 21/20* (2006.01)
*G01C 21/34* (2006.01)
*B60K 35/00* (2006.01)
*G01C 21/36* (2006.01)
*G08G 1/0967* (2006.01)
*G08G 1/0968* (2006.01)
*G08G 1/16* (2006.01)
*G08G 1/00* (2006.01)

(56) References Cited

U.S. PATENT DOCUMENTS

| | | | |
|---|---|---|---|
| 9,205,805 B2* | 12/2015 | Cudak | B60R 25/241 |
| 9,587,952 B1* | 3/2017 | Slusar | G06Q 10/00 |
| 2010/0082394 A1* | 4/2010 | Pachon | G06Q 10/02 |
| | | | 705/7.29 |
| 2017/0192423 A1* | 7/2017 | Rust | G05D 1/0038 |
| 2017/0192437 A1* | 7/2017 | Bier | G05D 1/0038 |

* cited by examiner

VEHICLE REMOTE ASSISTANCE MODE

INTRODUCTION

The present disclosure generally relates to autonomous vehicles, and more particularly relates to systems and methods for routing and remote assisting an autonomous vehicle.

An autonomous vehicle is a vehicle that is capable of sensing its environment and navigating with little or no user input. An autonomous vehicle senses its environment using sensing devices such as radar, lidar, image sensors, and the like. The autonomous vehicle system further uses information from global positioning systems (GPS) technology, navigation systems, vehicle-to-vehicle communication, vehicle-to-infrastructure technology, and/or drive-by-wire systems to navigate the vehicle.

Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

It is envisaged that special situations could arise that will require out of the ordinary decisions to be made by autonomous vehicle systems to avoid the autonomous vehicle becoming blocked. For example, road construction sites, closed roads, vehicle component failure can lead to blockage scenarios.

Accordingly, it is desirable to provide systems and methods that offer a solution to avoid the vehicle becoming blocked or to resolve blocked vehicle issues. Furthermore, other desirable features and characteristics of the present disclosure will become apparent from the subsequent detailed description and the appended claims, taken in conjunction with the accompanying drawings and the foregoing technical field and background.

SUMMARY

Systems and methods are provided for controlling a vehicle.

In one embodiment, a vehicle system is provided, including a router configured to access road map data and to calculate at least one route to a destination based on the road map data, thereby producing route solution data. The router is configured to receive remote assistance decision data and to responsively enter a remote assistance mode. In the remote assistance mode, the router is configured to determine at least one road segment of the road map data that is permitted to be blacklisted, thereby producing permitted blacklist data. A vehicle communications module is configured to transmit the permitted blacklist data and the route solution data to a remote vehicle assistance system.

In embodiments, the vehicle communications module is configured to receive blacklist data representing at least one blacklisted road segment from the remote vehicle assistance system.

In embodiments, the router is configured to update the road map data to exclude the at least one blacklisted road segment.

In embodiments, the router is configured to recalculate the at least one route to the destination based on the updated road map data, thereby produced updated route solution data.

In embodiments, the router is configured to provide the route solution data to an autonomous driving system.

In embodiments, the vehicle system includes a blockage arbiter configured to receive inputs from at least one of a positioning system and a computer vision system and to determine a remote assistance requirement, thereby producing the remote assistance decision data.

In embodiments, the road map data is provided as a graph data structure and the router is configured to calculate the at least one route to the destination based on the graph data structure using a graph traversal algorithm.

In embodiments, the router is configured to limit a distance of the at least one road segment from the vehicle system in determining the at least one road segment of the road map data that is permitted to be blacklisted.

In another embodiment, a vehicle is provided including the vehicle system described above. An autonomous driving system is configured to determine autonomous driving commands for directing the vehicle to the destination based on the route solution data, and an actuator system is configured to automatically control components of the vehicle so that the vehicle autonomously moves along the at least one route to the destination.

In another embodiment, a remote vehicle assistance system is provided including a remote communications module configured to receive permitted blacklist data and route solution data from a vehicle system. The permitted blacklist data includes at least one road segment of road map data that is permitted to be blacklisted and the route solution data represents at least one route to a target destination. A vehicle assistance tool is configured to select at least one road segment from the permitted blacklist data to be blacklisted, thereby producing blacklist data. The remote communications module configured to transmit the blacklist data to the vehicle system.

In embodiments, the remote vehicle system includes an operator interface tool configured to receive a human operator input as to the at least one road segment from the permitted blacklist data to be blacklisted.

In embodiments, the remote vehicle assistance system includes a display and is configured to display the at least one route to the target destination and to indicate the at least one road segment that is permitted to be blacklisted.

In an embodiment, a system is provided including the remote vehicle assistance system described above and a vehicle system. The vehicle system includes a router configured to access road map data and to calculate the at least one route to the target destination based on the road map data, thereby producing the route solution data. The router is configured to receive remote assistance decision data and to responsively enter a remote assistance mode. In the remote assistance mode, the router is configured to determine at least one road segment of the road map data that is permitted to be blacklisted, thereby producing the permitted blacklist data. A vehicle communications module is configured to transmit the permitted blacklist data and the route solution data to the remote assistance system.

In another embodiment, a computer implanted method of providing remote assistance to an autonomous vehicle including a vehicle system. The method calculates, via a router of the vehicle system that accesses road map data, at least one route to a destination based on the road map data, thereby producing route solution data. The vehicle system enters a remote assistance mode in response to remote assistance decision data received from a blockage arbiter of the vehicle system. In the remote assistance mode, the method includes determining, via the router, at least one road segment of the road map data that is permitted to be blacklisted, thereby producing permitted blacklist data. The method includes transmitting the permitted blacklist data and the route solution data, via a vehicle communications module of the vehicle system, to a remote vehicle assistance system.

In embodiments, the method includes receiving blacklist data, via the vehicle communications module, representing at least one blacklisted road segment from the remote vehicle assistance system.

In embodiments, the method includes updating, via the router, the road map data to exclude the at least one blacklisted road segment.

In embodiments, the method includes recalculating the at least one route to the destination based on the updated road map data, thereby produced updated route solution data.

In embodiments, the road map data is provided as a graph data structure.

In embodiments, the method includes the remote vehicle assistance system receiving, via a remote communications module, the permitted blacklist data and the route solution data from the vehicle system, and selecting, via a vehicle assistance tool, at least one road segment from the permitted blacklist data to be blacklisted, thereby producing the blacklist data; and transmitting the blacklist data to the vehicle system via the remote communications module.

In embodiments, the method includes controlling, via an autonomous driving and actuator system, components of the vehicle so that the vehicle autonomously moves along the at least one route to the destination.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
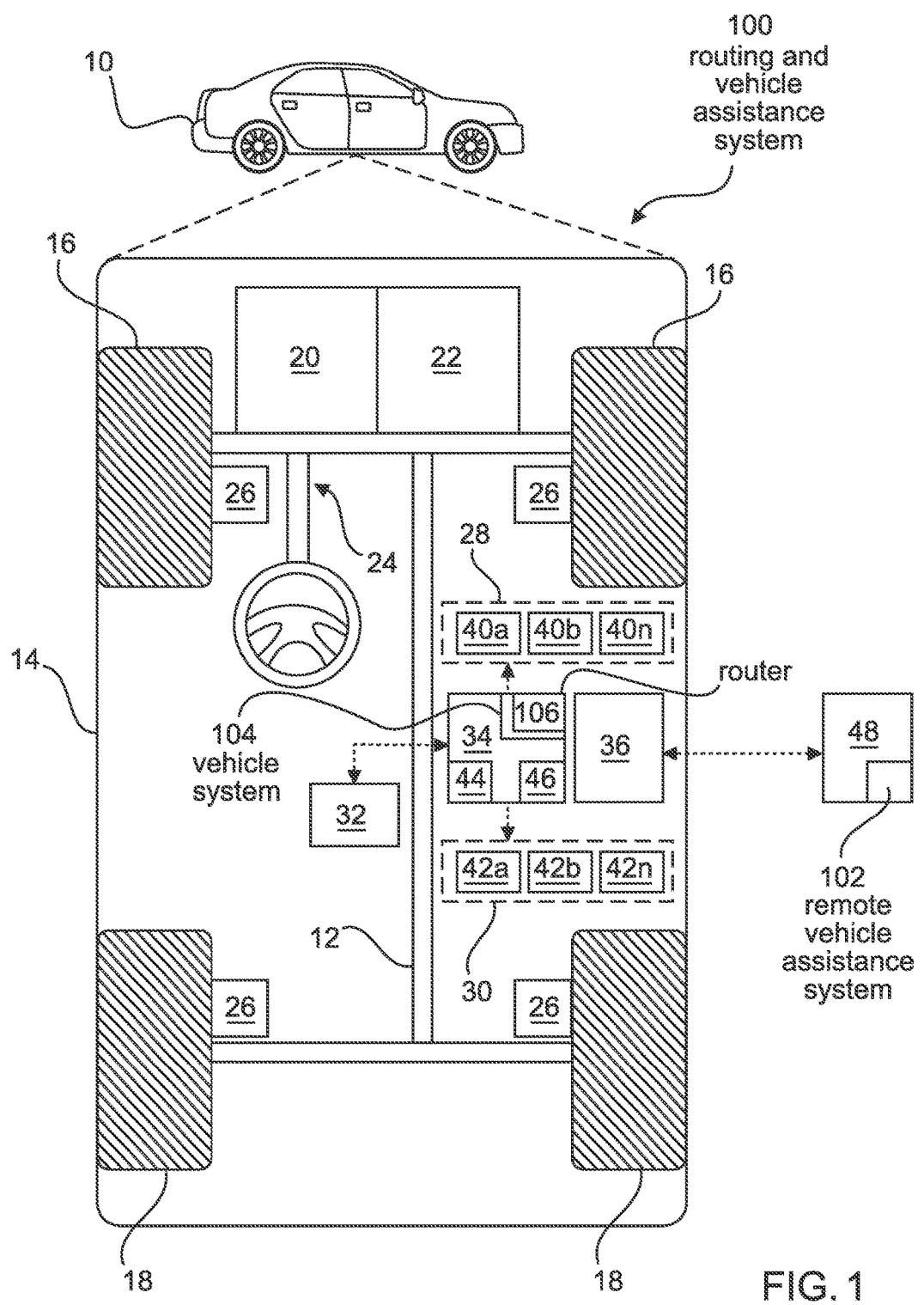
FIG. 1 is a functional block diagram illustrating an autonomous vehicle having a routing and vehicle assistance system, in accordance with various embodiments.

With reference to FIG. 1, a routing and vehicle assistance system shown generally at 100 is associated with a vehicle 10 in accordance with various embodiments. In general, the routing and vehicle assistance system 100 includes a router 106 that generates route solution data and permitted blacklist data and transmits such pre-calculated data to a remote vehicle assistance system 102 in the event of a determination that remote vehicle assistance is required. Blacklist data defines at least one road segment that is to be removed as an option for the router 106 in determining route solution data. The remote vehicle assistance system 102 provides a tool for selecting at least one road segment from the permitted blacklist data to be blacklisted. Blacklisted data is transmitted from the remote vehicle assistance system 102 to a router for recalculating route solution data using road map data with at least one blacklisted road segment removed from the road map data. The routing and vehicle assistance system 100 intelligently controls the vehicle 10 based partly on the recalculated route solution data.

As depicted in FIG. 1, the vehicle 10 is an automobile that generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the vehicle system 104 and the router 106 is incorporated into the autonomous vehicle 10. The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, inertial measurement units, and/or other sensors. The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

Figure 2:
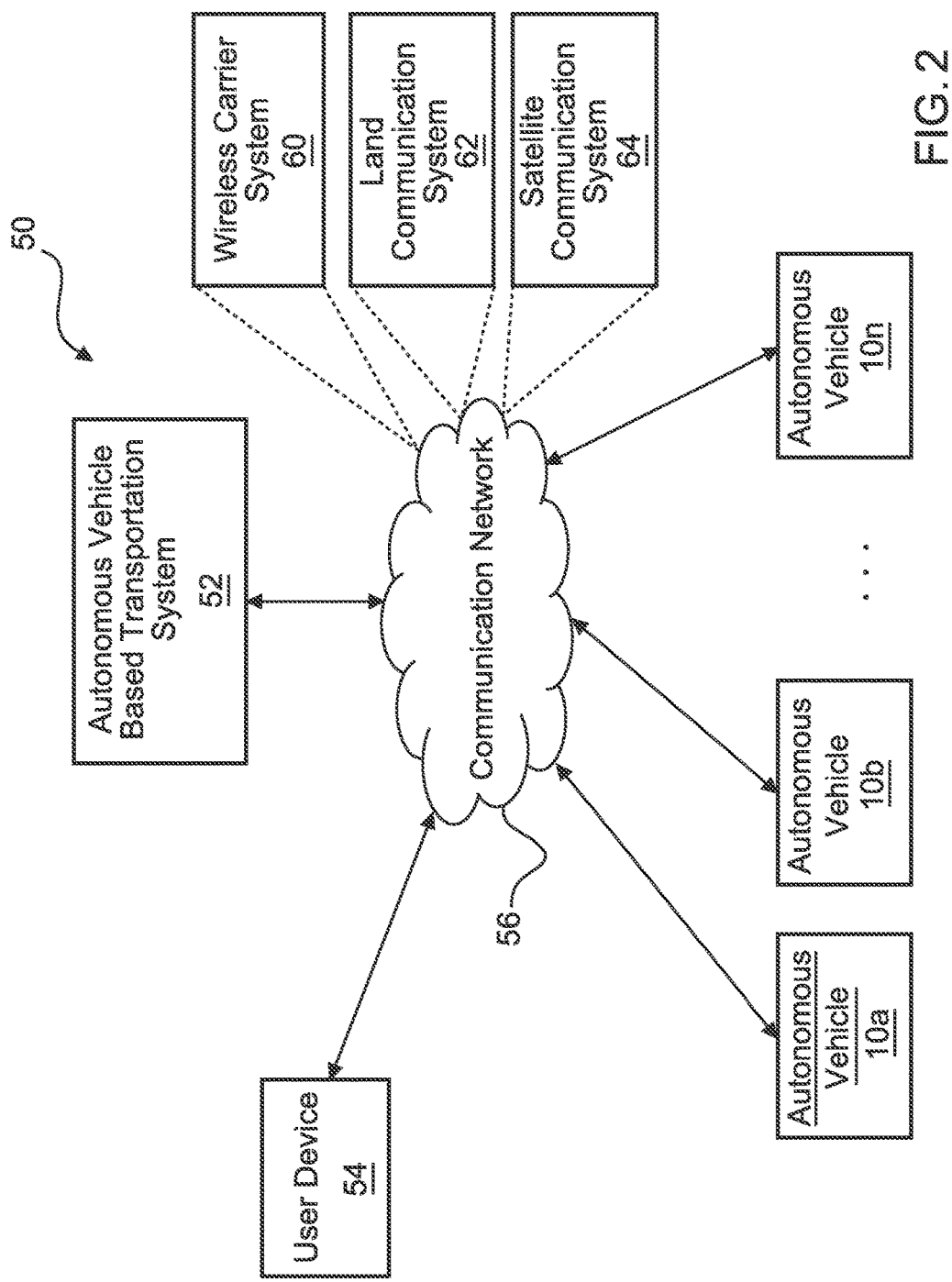
FIG. 2 is a functional block diagram illustrating a transportation system having one or more autonomous vehicles of FIG. 1, in accordance with various embodiments.

The communication system 36 is configured to wirelessly communicate information to and from other entities 48, such as but not limited to, other vehicles ("V2V" communication) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the controller 34 are embodied in the vehicle system 104 and the router 106. The instructions, when executed by the processor 44, cause road map data to be accessed by the router 106 and a route solution to be calculated by the router 106. The instructions also cause a determination to be made that remote assistance is required, thereby establishing a remote assistance mode. In the remote assistance mode, the instructions cause a determination of permitted blacklist data based on distance from the current location of the vehicle 10 and current route solution data. The permitted blacklist data and the route solution data is transmitted to the remote vehicle assistance system 102, which returns blacklist data. The instructions cause the route solution to be recalculated whilst taking into account the blacklist data from the remote vehicle assistance system 102.

With reference now to FIG. 2, in various embodiments, the autonomous vehicle 10 described with regard to FIG. 1 may be suitable for use in the context of a taxi or shuttle system in a certain geographical area (e.g., a city, a school or business campus, a shopping center, an amusement park, an event center, or the like) or may simply be managed by a remote system. For example, the autonomous vehicle 10 may be associated with an autonomous vehicle based remote transportation system. FIG. 2 illustrates an exemplary embodiment of an operating environment shown generally at 50 that includes an autonomous vehicle based remote transportation system 52 that is associated with one or more autonomous vehicles 10a-10n as described with regard to FIG. 1. In various embodiments, the operating environment 50 further includes one or more user devices 54 that communicate with the autonomous vehicle 10 and/or the remote transportation system 52 via a communication network 56.

The communication network 56 supports communication as needed between devices, systems, and components supported by the operating environment 50 (e.g., via tangible communication links and/or wireless communication links). For example, the communication network 56 can include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the autonomous vehicles 10a-10n. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62, but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a piece of home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, which may be cloud-based, network-based, or resident at the particular campus or geographical location serviced by the remote transportation system 52. The remote transportation system 52 can be manned by a live advisor, or an automated advisor, or a combination of both. The remote transportation system 52 can communicate with the user devices 54 and the autonomous vehicles 10a-10n to schedule rides, dispatch autonomous vehicles 10a-10n, and the like. In various embodiments, the remote transportation system 52 stores account information such as subscriber authentication information, vehicle identifiers, profile records, behavioral patterns, and other pertinent subscriber information.

In accordance with a typical use case workflow, a registered user of the remote transportation system 52 can create a ride request via the user device 54. The ride request will typically indicate the passenger's desired pickup location (or current GPS location), the desired destination location (which may identify a predefined vehicle stop and/or a user-specified passenger destination), and a pickup time. The remote transportation system 52 receives the ride request, processes the request, and dispatches a selected one of the autonomous vehicles 10a-10n (when and if one is available) to pick up the passenger at the designated pickup location and at the appropriate time. The remote transportation system 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline autonomous vehicle 10 and/or an autonomous vehicle based remote transportation system 52. To this end, an autonomous vehicle and autonomous vehicle based remote transportation system can be modified, enhanced, or otherwise supplemented to provide the additional features described in more detail below.

Figure 3:
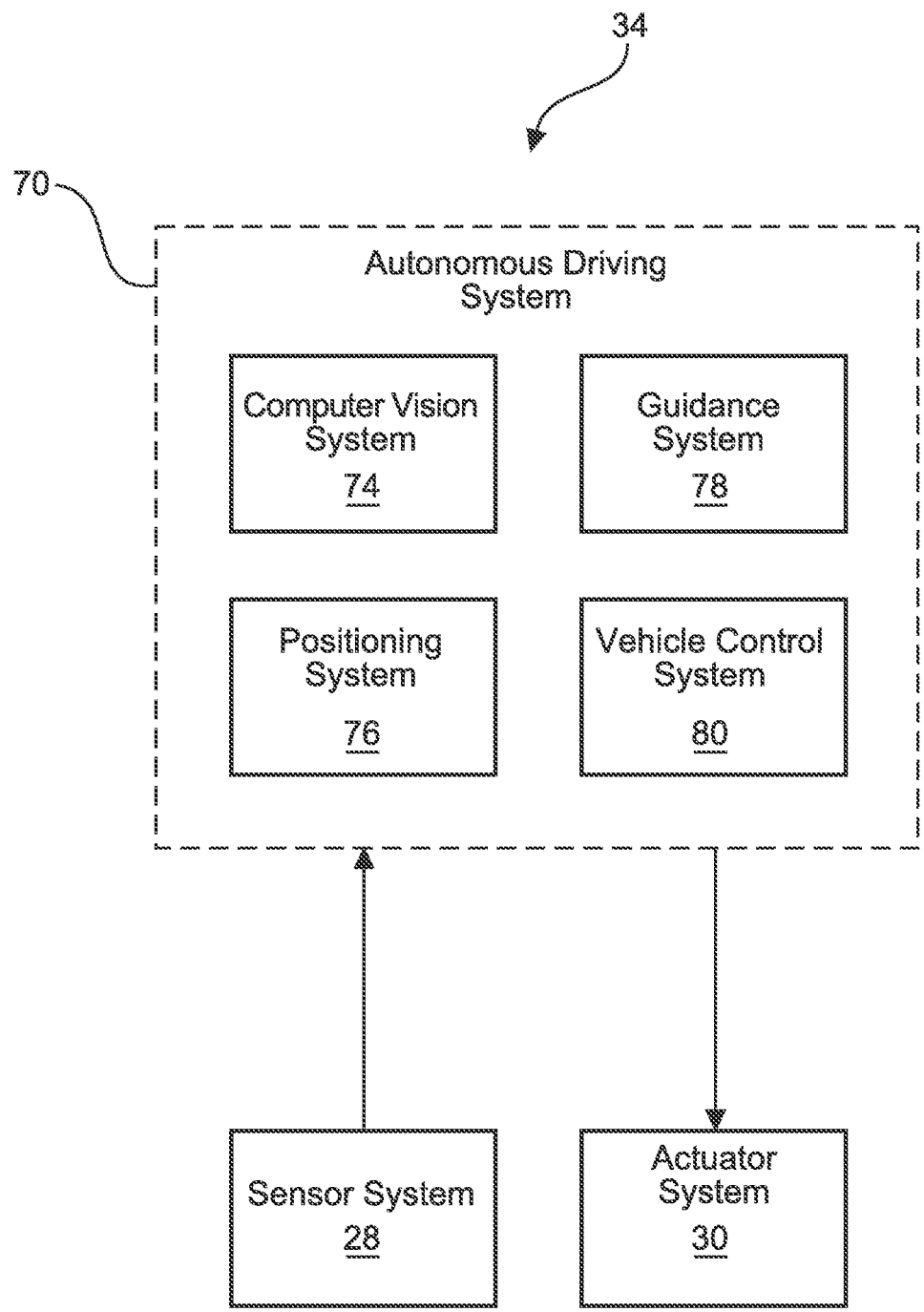
FIG. 3 is a functional block diagrams illustrating an autonomous driving system that is operatively associated with the routing and vehicle assistance system of the autonomous vehicle, in accordance with various embodiments.

In accordance with various embodiments, the controller 34 implements an autonomous driving system (ADS) 70 as shown in FIG. 3. That is, suitable software and/or hardware components of the controller 34 (e.g., the processor 44 and the computer-readable storage device 46) are utilized to provide an autonomous driving system 70 that is used in conjunction with vehicle 10.

In various embodiments, the instructions of the autonomous driving system 70 may be organized by function, module, or system. For example, as shown in FIG. 3, the autonomous driving system 70 can include a computer vision system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the computer vision system 74 synthesizes and processes sensor data and predicts the presence, location, classification, and/or path of objects and features of the environment of the vehicle 10. In various embodiments, the computer vision system 74 can incorporate information from multiple sensors, including but not limited to cameras, lidars, radars, and/or any number of other types of sensors.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The router 106 described herein is included in the guidance system 78, in accordance with various embodiments. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

As mentioned briefly above, the vehicle system 104 and the router 106 of FIG. 1 are included within the ADS 70, for example, as part of the guidance system 78. Further, the ADS 70 is in communication with the remote vehicle assistance system 102 in the event of vehicle assistance being required. More specifically, the router 106 is configured to generate route solution data defining at least one path as part of the guidance system 78. The at least one path is used to control the vehicle 10 to move along the path. The guidance system 78 makes use of a blockage arbiter 108 that algorithmically decides when remote vehicle assistance is required. The router 106 is responsive to the blockage arbiter 108 and transmits permitted blacklist data and route solution data to the remote vehicle assistance system 102 for determining at least one road segment to be blacklisted as part of blacklisted data. The blacklisted data is returned to the router 106 and is used to update road map data. The router 106 is configured to recalculate route solution data based on the updated road map data, thereby excluding routes that traverse blacklisted road segments as defined by the blacklisted data. The guidance system 78 thus produces an updated path defined by the router solution data for use by the vehicle control system 80 to move the vehicle 10 along the updated path.

Figure 4:
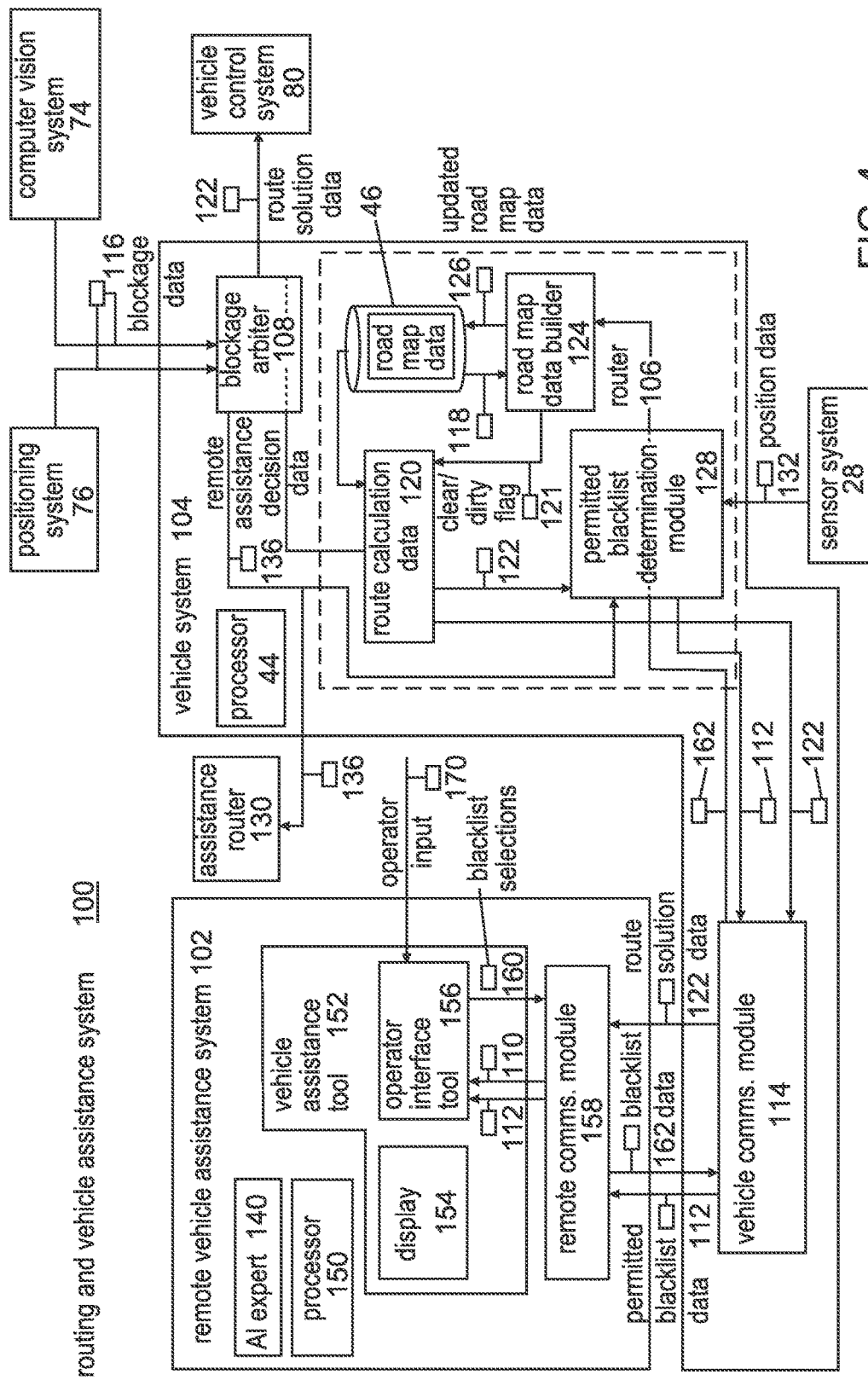
FIG. 4 is a functional block diagram illustrating a routing and vehicle assistance system and exemplary data flows, in accordance with various embodiments.

For example, as shown in more detail with regard to FIG. 4 and with continued reference to FIG. 3, the routing and vehicle assistance system 100 allows for remotely assisting autonomous vehicle operation and includes a vehicle system embodied in onboard controller 34 and a remote vehicle assistance system 102 including a vehicle assistance tool 152 providing a human expert interface by accepting an operator input through an operator interface tool 156. FIG. 4 provides a functional block diagram of components of the system 100 as well as illustrating exemplary data flows between such functional blocks. The routing and vehicle assistance system 100 additionally includes, in some embodiments, an assistance router 130 and/or an artificially intelligent (AI) expert 140. The routing and vehicle assistance system 100 is further described in U.S. patent application Ser. No. 15/398,577 entitled "SYSTEM AND METHOD FOR AUTONOMOUS VEHICLE FLEET ROUTING" and U.S. patent application Ser. No. 15/398,562 entitled "SYSTEM AND METHOD FOR REMOTELY ASSISTING AUTONOMOUS VEHICLE OPERATION".

The system 100 functions to enable remote assistance to augment the intelligence of the vehicle system 104 of the autonomous vehicle 10. While the artificial controllers 34 of autonomous vehicles perform better than their human driver counterparts at many tasks, there are some scenarios in which the vehicle system 104 may wish to request assistance in analyzing data or deciding for successfully negotiating the scenario(s). Traditionally, this problem has been addressed by utilizing the skills of a human driver riding in the autonomous vehicle 10; however, this solution requires that a human driver be present and capable of taking control of the vehicle 10.

The system 100 enables the vehicle system 104 to request assistance from another source; such as a human expert operating a human operator interface tool 156 at a remote vehicle assistance system 102 embodied in a computer system that includes one or more processors 150 and computer readable instructions for implementing the computer functions described herein. Additionally or alternatively, the system 100, in some embodiments, enables the vehicle system 104 to request assistance from another vehicle system in the fleet of autonomous vehicles 10a, 10b . . . 10n or an artificially-intelligent expert 140 included as part of the vehicle assistance system 100. For instance, vehicle system 104 may identify one or more additional autonomous vehicles 10a, 10b . . . 10n in a close proximity. In such example, the vehicle system 104 is able to send the assistance request to one or more of the additional autonomous vehicles 10, 10b . . . 10n including a request to access one or more cameras of the additional autonomous vehicles 10a, 10*b* . . . 10*n* in order to obtain additional views of a scenario, where the additional views are not viewable by any of the onboard cameras of the autonomous vehicles 10, 10*b* . . . 10*n* making the assistance request. With the additional camera views of a scenario, the vehicle system 104 is, in embodiments, able to negotiate a resolution to the assistance-desired scenario without necessarily contacting the human operator interface tool 156 and/or the AI expert 140.

There are various situations in which the vehicle system 104 desires assistance such as from remote vehicle assistance system 102, as exemplified in the description that follows. The vehicle system 104 includes a blockage arbiter 108 configured to determine that assistance is desired. In embodiments, the blockage arbiter 108 is configured to receive blockage data 116 from positioning system 76 and/or from computer vision system 74 and/or from other sources. The blockage data 116 includes, in some examples, imaging of the vehicle's surroundings indicating unexpected road changes (e.g. construction work) from computer vision system 74 and/or an indication that the vehicle is not moving or not progressing from the positioning system 76. The blockage data 116, in additional or alternative embodiments, comes from external sources such as broadcast bulletins and/or one or more other autonomous vehicles 10*a*, 10*b* . . . 10*n*. The blockage arbiter 108 is configured to process the blockage data 116 to algorithmically identify whether a scenario is encountered in which assistance is required. In some circumstances, the blockage arbiter 108 determines that assistance from the remote vehicle assistance system is required and correspondingly outputs remote assistance decision data 136 to the router 106 and/or the assistance router 130. The remote assistance decision data 136 is effective to cause the vehicle system 104 to enter a remote assistance mode in which communication is established with the remote vehicle assistance system 102 through vehicle communications module 114 (which is part of communication system 36 described with respect to FIG. 1) and remote communications module 158. The remote assistance mode allows the remote vehicle assistance system 102 to communicate assistance in the form of control data (including blacklist data 162) to overcome the vehicle's blockage, as described further below.

Some example scenarios in which remote assistance is desired include scenarios in which autonomous vehicle sensing is impaired (e.g., due to sensor failure, environmental hazards, or other causes), scenarios in which autonomous vehicle operation is impaired (e.g., a flat tire, engine problems, control interface issues, onboard computer malfunction), scenarios in which autonomous vehicle decision-making confidence is low (e.g., unrecognized objects in the road, a vehicle or pedestrian behaving erratically, objects blocking a path of the autonomous vehicle), and scenarios in which interaction is otherwise desired with environment or other entities (e.g., inclement weather, a passenger or pedestrian is in need of medical assistance, a vehicle is occupied by an unauthenticated individual, an item has been left in a vehicle by a previous occupant). In some embodiments, remote assistance is able to be requested by an occupant of the autonomous vehicle 10. Blockage data 116 indicating such scenarios is provided to the blockage arbiter 108 from any of a number of possible sources of the vehicle system 104 or external systems to allow a determination on whether remote assistance is required.

As another example, the autonomous vehicle 10 encounters an assistance-desired scenario in which the only possible routing or path for traversing the assistance-desired scenario involves violating one or more traffic laws or violating vehicle travelling norms and general rerouting (e.g., in compliance with traffic laws) of the autonomous vehicle 10 is not an available option. These type of assistance-desired scenarios require, in some instances, that the autonomous vehicle 10 traverse across a double yellow line and into opposing traffic possibly to avoid an accident or a double-parked vehicle or the like. However, in some embodiments, the standard control and/or operational parameters for the autonomous vehicle 10 do not allow for the autonomous vehicle 10 to expressly violate traffic laws and further, the autonomous vehicle 10 does not, in some examples, have internal protocols sufficient to navigate across a double yellow line. In such embodiments, the remote vehicle assistance system 102 intervenes either via request from the autonomous vehicle 10 or automatically by the remote vehicle assistance system 102 without a direct request from the autonomous vehicle.

In response to the assistance-desired scenario, a human expert at the operator interface tool 156 takes control of the autonomous vehicle in order to traverse the double yellow lines remotely, in some embodiments. Alternatively, the vehicle assistance tool 152 is responsive to the assistance-desired scenario by drawing, generating and/or selecting a proposed route for traversing the assistance-desired scenario and transmitting the proposed route to the autonomous vehicle 10 for implementation and/or execution. For instance, the vehicle assistance tool 152 is configured to re-draw existing boundary lines, such as traffic lines that define a road or travel lane, using an operator interface tool 156, such as a touch-sensitive display 154. In such examples, a human expert at the vehicle assistance tool 152 is able to use an input tool to provide an operator input 170, such as a drawing pen or their finger, to draw new boundary lines or a new travel lane onto the display 154 showing an actual view of the circumstances around the autonomous vehicle 10. The re-drawn boundary lines once completed or at a time at which the new boundary lines are being drawn by the human expert at operator interface tool 156 are, in embodiments, transmitted, via a remote communications module 158, to be displayed at an interface (not shown) of the autonomous vehicle 10, and displayed at a corresponding position of a schematic showing the circumstances around the vehicle 10. Essentially, the human expert is able to draw new lanes for navigating an avoidance scenario on the operator interface tool 156 and at the same time or contemporaneous with the drawing by the human expert, the new travel lanes will appear on the interface of the autonomous vehicle 10. Additionally or alternatively, by drawing the new route by the human expert, the remote vehicle assistance system 102 is configured to automatically generate autonomous vehicle control data that will be transmitted to the autonomous vehicle 10 along with or separate from the drawing via the remote communications module 158. The autonomous vehicle control data includes, in embodiments, computer instructions, that when executed by the controller 34 of the autonomous vehicle 10, enables the autonomous vehicle 10 to travel along the redrawn boundary lines by way of the autonomous driving system 70.

Another exemplary assistance-desired scenario includes when the roads are repainted and/or construction in which the autonomous vehicle 10 must drive the wrong direction or path and in another lane, as described similarly above. These types of scenarios give rise to circumstances in which a two-way road becomes a bi-directional one way shared road that may include traffic signal controllers (e.g., human traffic guidance) and the like. In embodiments, the remote vehicle assistance system 102 is configured to intervene to provide one or more routing options to the autonomous vehicle 10, including generally rerouting and/or rerouting using redrawn boundary lines to assist the autonomous vehicle 10 in negotiating the scenario.

In embodiments, the system 100 routes assistance requests or assistance to autonomous vehicles 10 using the assistance router 130. However, it is envisaged that the system 100 routes requests in any manner.

The vehicle system 104 functions to control an autonomous vehicle 10 as hereinbefore described. The vehicle system 104 is coupled to a sensor system 28 (e.g., computer vision system, LIDAR, wheel speed sensors, GPS, etc.) and processes sensed data from the sensor system 28 in order to determine the state of the autonomous vehicle 10; and, based upon the vehicle state and programmed instructions, the vehicle system 104 modifies or controls behavior of the autonomous vehicle 10 through the autonomous driving system 70.

The vehicle assistance tool 152 functions to allow a human to view, assess, and respond to remote assistance requests originating at the vehicle system 104. The vehicle assistance tool 152 enables a human expert to view assistance data (e.g., transmitted as part of an assistance request) and create or select responses based on the assistance data.

In embodiments, assistance data includes raw sensor data (e.g., the view of a camera of the autonomous vehicle 10), processed sensor data (e.g., a camera view overlaid with object identification indicators placed by the autonomous vehicle's controller 34, predicted vehicle trajectory), autonomous vehicle analysis (e.g., a text description, generated by the autonomous vehicle, of a scene imaged by a machine vision system), historical behavior of the autonomous vehicle 10, planned future (or proposed) behavior of the autonomous vehicle 10, autonomous vehicle state, environment state, communication data from another entity (e.g., occupants of the vehicle, pedestrians, authorities, an internal or external entity that has accessed the vehicle, users of a driverless vehicle service etc.), or any other data.

The vehicle assistance tool 152 includes one or more output interfaces, such as the display 154 (e.g., a screen, a touch-sensitive display panel or screen, any known display, etc.) as well an input interfaces such as the operator interface tool 156 (e.g., keyboard and mouse, steering wheel and pedals, tablet, microphone, any known input device, etc.) and one or more processors (not shown) to assist in evaluating an assistance request for responding to assistance requests or an opportunity to provide remote assistance to an autonomous vehicle 10.

The assistance router 130 functions to route assistance requests generated at a vehicle system 104 to an assistor (e.g., another vehicle system, a vehicle assistance tool 152, and/or an AI expert 140). For example, the assistance router 130 selects a human expert from a list of available experts to provide assistance to the autonomous vehicle 10, or determine whether an assistance request should be routed to a vehicle assistance tool 152 or to an AI expert 140.

The assistance router 130 additionally or alternatively partitions assistance requests (e.g., request part of a response from a vehicle assistance tool 152 and another part from an AI expert 140) or send them to multiple destinations at once (e.g., send an assistance request to several human expert operator interface tools 156).

In embodiments, the assistance router 130 routes assistance request responses; for example, the assistance router 130 broadcasts a generalized response to a number of vehicles in an area. The assistance router 130 additionally or alternatively performs assistance request response processing. Response processing includes combining, selecting, fusing, prioritizing, or processing multiple proposed assistance request responses (or response components) in any manner. For example, the assistance router 130 uses a voting or weighting system to select and/or combine assistance request responses before routing them to a vehicle (or group of vehicles). Additionally, the assistance router 130 analyzes, in some embodiments, the assistance data of the assistance request to identify a subject to which the assistance request is related. The assistance router 130 in such a case compares parts of the assistance data to a predetermined list or otherwise, extract elements from the assistance data to generate a subject to which the assistance request is most closely related. By identifying a subject of the assistance request, the assistance router 130 is able to more efficiently route the assistance request to an appropriate assistor.

In prioritizing multiple assistance requests, once the assistance router 130 identifies a subject of each of the assistance requests or if each of the assistance requests were previously tagged with identifying information, the assistance router 130 compares the identified or tagged subject of each assistance request to a predetermined prioritization list which enables the assistance router 130 to rank each of the multiple assistance requests in order of priority or importance. For instance, scenarios involving a pedestrian may be ranked higher on the list than scenarios involving stationary objects with no human passengers or pedestrians involved.

The assistance router 130 is, in embodiments, a general-purpose computer, but may additionally or alternatively be any suitable electronic device capable of routing assistance requests. The assistance router 130 includes a communication interface or communication circuits that the assistance router 130 uses to communicate and/or interface with any other computers, systems, external communication interfaces, and the like. In this way, the assistance router 130 uses the communication interface to route the assistance request to the identified recipients. In some embodiments, the assistance router 130 forms part of the vehicle system 104 such that it uses part of the circuitry and processing capabilities of the vehicle system 104 to identify routing for an assistance request.

The artificially-intelligent (AI) expert 140 functions to provide automated assistance request responses. The AI expert 140 is able to leverage substantially greater computing power and/or resources (e.g., databases, data from other vehicles, etc.) than the vehicle system 104, which enables the AI expert 140 to potentially provide better solutions in shorter timeframes than would be possible with the vehicle system 104. Additionally, and/or alternatively, the AI expert 140 provides partial solutions or solutions that may be used to augment a solution from the onboard computing device 110 and/or the human operator interface tool 156 to thereby provide a mixed solution to an assistance request. The AI Expert 140 is operable on a distributed computing system, but may additionally or alternatively operate on any suitable computing system.

Assistance request responses are, in embodiments, generated using any combination of vehicle assistance tool 152 data and AI expert 140 data. For example, the AI expert 140 generates proposed responses that a human expert selects in the human operator interface tool 156.

The remote vehicle assistance system 102 is further configured to trigger a deviation from an optimal route. In some embodiments, the deviation is implemented by black-listing selected road segments. The road segments for black-listing are selected by a human operator through the vehicle assistance tool 152 and/or by the AI expert 140. There are some road segments that should not be removed/blacklisted from a route solution or else travelling options for the autonomous vehicle 10 would be reduced to zero. That means, for instance, it should not be possible to blacklist any road segments that the autonomous vehicle 10 is currently occupying, or any future road segments, if removing them would reduce the number of available options to zero. The vehicle system 104 is configured to pre-calculate a list of road segments that are permitted to be blacklisted in the form of permitted blacklist data 112. The remote vehicle assistance system 102 is configured to select road segments to be blacklisted from the list of road segments that are permitted to be blacklisted as embodied in the permitted blacklist data 112 and to consequently produce blacklist data 162. The blacklist data 162 is utilized by the vehicle system 104 to update road map data 118 and to recalculate a route solution with the blacklisted road segments excluded. A new solution in the form of route solution data 122 is thus produced that traverses an identified blockage in a way that makes use of remote vehicle assistance and does so efficiently by generating permitted blacklist data 112, which reduces back and forth transmissions between the remote vehicle assistance system 102 and the vehicle system 104. The route solution data 122 is used by autonomous driving system 70, particularly vehicle control system 80, to traverse the determined path defined by the route solution data.

The vehicle system 104 includes a router 106 that is configured to determine route solution data 122 and to determine permitted blacklist data 112. The router 106 includes a route calculation unit 120 that operates iteratively at a predetermined frequency to take into account inputs from computer vision system 74, positioning system 76, destination data and road map data 118 from memory 46 to calculate an optimal route solution from a current location of the vehicle 10 to a selected destination. The destination is, in embodiments, set by a remote system 48 and/or by a vehicle occupant. Path finding algorithms utilizable by the route calculation unit 120 are known to the skilled person.

The road map data 118 defines attributes of roads available to the autonomous vehicle 10. The road map data 118 is, in some embodiments, generated from data collected by mapping vehicles that have moved along the road. Exemplary attributes included in the road map data 118 are lanes or road segments, constituting a basic building block of the road map data, defining real-world road aspects like lane center (a list of 2D points that are equivalent to lateral/longitudinal coordinates), left lane boundary, right lane boundary, outgoing lanes and incoming lanes. Road map data 118 includes a graph data structure, in some embodiments, that includes nodes connected by edges and also includes metadata such as cost for use by the route calculation unit 120 to search for a route solution. In embodiments, the nodes represent lanes in the road map data 118.

In embodiments, the route calculation unit 120 is configured to run a graph traversal algorithm in calculating a route solution, thereby producing the route solution data 122. One exemplary graph traversal algorithm determines the route solution by minimizing traversal cost to the destination. An optimal algorithm further calculates a probabilistic aspect to node transitions, whereby additional cost is factored in for lower probability of success edge traversals. One example of this is that lane changes have a certain risk of not succeeding if there is too much traffic in the target lane, or if the maneuver is attempted too close to an intersection. Adding high cost to some of these maneuvers and propagating them backwards in the graph allows the router 106 to avoid probable failure situations more globally. Further information on a graph traversal algorithm that takes into account both basic cost (e.g. shortest time, distance, etc.) as well as any additional cost from probability of success at node transitions is provided in U.S. patent application Ser. No. 15/398,577.

The route calculation unit 120 is configured to produce route solution data 122 defining at least an optimal route to the destination. In embodiments, the route solution data 122 includes not only an optimal route, but also alternative routes from a current location to the destination. The route calculation unit 120 is configured to perform a neighborhood search around a current location of the vehicle 10 that queries possible departures from the optimal route and consequently calculates a route based on the queried departure. In some embodiments, the route solution data 122 includes optimal route data and alternative route data. The route solution data 122 includes, in embodiments, a list of routes including the optimal route and alternative routes, wherein each route is defined by a list of lanes or road segments. As described above, in exemplary embodiments, lanes or road segments make up nodes in a graph data structure of the road map data 118. The route solution data 122 also includes, in various embodiments, metadata like route cost, length, etc., for each route.

The vehicle system 104 includes a blockage arbiter 108 in various embodiments, as has been described above. The blockage arbiter 108 assesses situations from information about the autonomous vehicle 10 and/or an environment of the vehicle. An exemplary input for making such assessments is information from the positioning system 76 allowing position and movement of the vehicle 10 to be assessed to assist in determining a blockage situation. Another exemplary input for assessing vehicle situations is information from the computer vision system 74 allowing images from around the vehicle 10 to be utilized to determine any unusual conditions that require remote assistance. The blockage arbiter 108 receives information from other vehicles, from a remote system through the communication system 36 and/or from the vehicle control system 80, in additional or alternative embodiments. The blockage arbiter 108 is configured to execute an arbitration algorithm to assess any blockage events that make connection to remote vehicle assistance system 102 desirable. The blockage arbiter outputs remote assistance decision data 136 that is operable to commence entry into remote assistance mode. There are a number of possible triggers for remote assistance, such as the vision system 74 perceiving construction signs, the position system 76 perceiving the car not moving for a certain amount of time and other cues that make it desirable to bring the remote vehicle assistance system 102 into the loop. Other example blockage scenarios have been described in the foregoing.

The vehicle system 104 includes, in various embodiments, a permitted blacklist determination module 128 as part of the router 106. The permitted blacklist determination module 128 is configured to receive the remote assistance decision data 136 as an indication of remote assistance mode. Further, the permitted blacklist determination module 128 is configured to receive the route solution data 122. In the remote assistance mode, the permitted blacklist determination module 128 is configured to determine which road segments/lanes are able to be removed/blacklisted from the optimal route and alternative routes defined in the route solution data 122, whilst ensuring that at least route to the destination remains. For example, a particular node may be necessary for all route alternatives. Another example road segment that should not be blacklisted is the road segment that the vehicle 10 currently occupies. The permitted blacklist determination module 128 is configured to receive position data 132 from the sensor system 28 (e.g. a GPS receiver) and/or from a positioning system 76 in some embodiments to allow determination of a current road segment. In exemplary embodiments, the permitted blacklist determination module 128 is configured to receive route solution data 122 in the form of a central graph data structure and, based on the autonomous vehicle's current location and the available graph, a subset of the graph that can be removed is determined such that the vehicle 10 is still guaranteed to find a route to the destination. The permitted blacklist determination module 128 is thus configured to generate and output permitted blacklist data 112, which defines a list of road segments that have been determined are permitted to be blacklisted.

In some embodiments, the permitted black list determination module 128 is configured to distance limit the list of road segments to a predetermined or dynamically determined reasonable distance from a current location of the vehicle 10, as is derivable from the position data 132.

In accordance with embodiments, the vehicle system 104 is configured to transmit the permitted blacklist data 112 and the route solution data 122 at regular intervals during the remote assistance mode, via the vehicle communications module 114.

The vehicle assistance tool 152 of the remote vehicle assistance system 102 is configured to receive the permitted blacklist data 112 and the route solution data 122, via the remote communications module 158, and to present information to a human operator or the AI expert 140 based thereon. In embodiments, the vehicle assistance tool 156 is configured to generate an output on the display 154 based on the route solution data 122 and the permitted blacklist data 112. From presented alternative route solutions derived from the route solution data 122 and presented permitted blacklist data 112, a human operator (and/or the AI expert 140 in additional or alternative embodiments) is configured to select one or more road segments from road segments permitted to be blacklisted, as derived from the permitted blacklist data 112. The one or more road segments are selected to be blacklisted with the aim of exiting the perceived blockage scenario. The vehicle system 104 is, in certain embodiments, configured to transmit images and other sensed information from the sensor system to allow the AI expert 140 and/or the human operator to perceive the environment of the autonomous vehicle 10, thereby enabling an informed decision on optimal road segments for blacklisting to remove the cause for remote the remote assistance mode. In this way, the remote vehicle assistance system 102 determines blacklist data 162 defining which one or more road segments from the permitted blacklist data 112 are to be blacklisted. The remote vehicle assistance system 102 transmits the blacklist data 162 to the vehicle system 104 via the remote communications module 158 and the vehicle communications module 114. Accordingly, a set of road segments, in the form of permitted blacklist data 112, that are safe to blacklist is periodically sent to the vehicle assistance tool 152, and the human operator selects a subset of these, through the operator interface tool 156, based on the perception and environment of the vehicle 10 and the alternative routes defined by the route solution data 122, to determine blacklist data 162 for sending back to the vehicle system 104.

The vehicle system 104 is configured to receive the blacklist data 162 and to build updated road map data 126 excluding one or more blacklisted road segments as defined by the blacklist data 162, in accordance with various embodiments. To do so, the vehicle system includes a road map data builder 124 that receives old road map data 118 from memory 46 and blacklist data 162 and executes a map building algorithm that removes blacklisted road segments. The updated road map data 126 is stored in the memory 46 as part of the road map data 118 and subsequently provided to the route calculation unit 120. As such, the route calculation unit 120 is configured to determine an optimal route and alternative routes for route solution data 122 based on the updated road map data 126, thereby determining upon an optimal route without utilizing blacklisted road segments so that the cause of entering the remote assistance mode (e.g. the blockage of some kind) is avoided.

As has been described, in exemplary embodiments, the selected road blacklisted segments get sent back to the router 106 as part of blacklist data 162. The road map data builder 124 of the router 106 rebuilds a graph data structure of the road map data 118 with road segments blacklisted as prescribed by the blacklist data 162, thereby providing an updated graph data structure 126. The steps of rebuilding the road map data 118, in addition to refreshing any caches with the new road map data 118, takes a longer time than the route calculation unit 120 calculating route solution data 122 at a greater frequency. In embodiments, the step of creating updated road map data 126, e.g. updated graph data structure 126, based on the blacklist data 162 is computed in a background thread, whilst a main thread continues broadcasting (e.g. to the vehicle control system 80) a route solution, as part of route solution data 122, based on the old, as yet not updated by the road map data builder 124, data 118. That route is marked or flagged as "dirty" data. The road map data builder 124 is configured to output a clean or dirty flag 121 to the route calculation unit 120 when the background thread is operating to allow marking of the route solution data 122. Once the background thread finishes its computation, i.e. once the road map data builder 124 completes creating the updated road map data 126, the road map data builder 124 replaces the road map data 118, e.g. a graph data structure, in a thread safe way, and the router 106 broadcasts the updated solution (e.g. to the vehicle control system 80), which is now marked as "clean" data.

The clean/dirty marking of the route solution data 122 is an exemplary implementation feature. The clean/dirty marking allows various downstream systems to take into account the update-pending status of the route solution data 122. Accordingly, the autonomous driving system 70 is configured to be responsive to clean/dirty marking of the route solution data 122 in determining autonomous driving actions. For example, when the autonomous vehicle 10 finishes a ride and sees that its data is outdated, it would not start another ride until the update has been completed.

The blockage arbiter 108 is configured to continue assessing whether there is a blockage situation to determine whether the updated road map data 126 and the associated recalculated route solution data 122 has removed the cause for the remote assistance mode. If so, the remote assistance mode is exited so that transmission of the permitted blacklist data 112 and the route solution data 122 can cease. Additionally or alternatively, the remote vehicle assistance system 102 transmits command data to exit the remote assistance mode either through human decision at the operator interface tool 156 or through decision of the AI expert 140.

Figure 5:
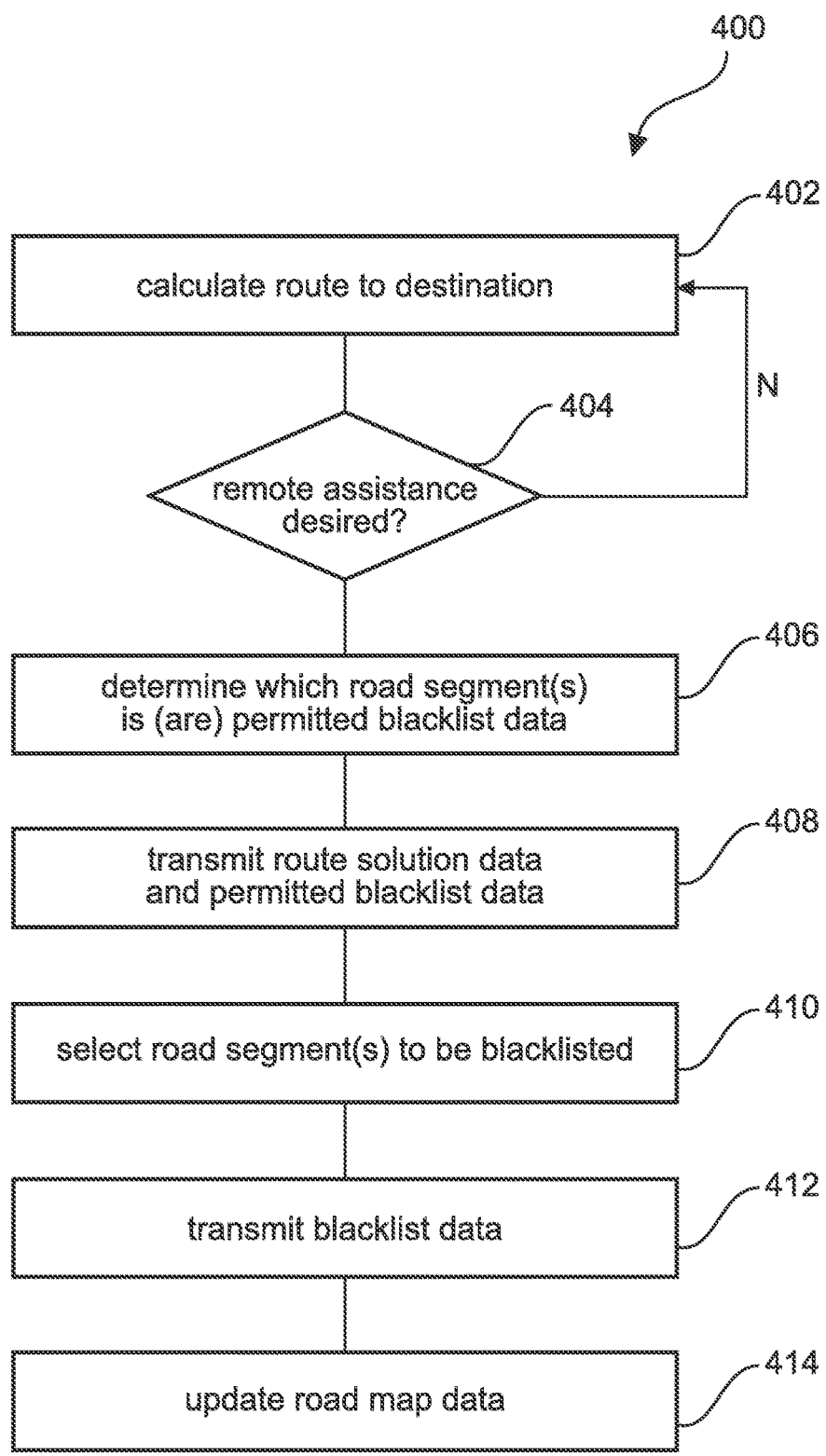
FIG. 5 is a flowchart illustrating a control method for controlling the autonomous vehicle, in accordance with various embodiments.

Referring now to FIG. 5, and with continued reference to FIGS. 1-4, a flowchart illustrates a control method 400 that can be performed by the routing and vehicle assistance system 100 of FIG. 1, in accordance with the present disclosure. As can be appreciated in light of the disclosure, the order of operation within the method is not limited to the sequential execution as illustrated in FIG. 5, but may be performed in one or more varying orders as applicable and in accordance with the present disclosure. In various embodiments, the method 400 can be scheduled to run based on one or more predetermined events, and/or can run continuously during operation of the autonomous vehicle 10.

The method 400 is computer implemented by way of at least one processor 44, 150 executing computer readable instructions distributed between at the remote vehicle assistance system 102 and the vehicle system 104. The computer implemented method 400 includes a step 402 of calculating a route to a destination. The route is calculated by the route calculation unit 120 of the router 106 and is embodied in route solution data 122. Step 402 includes calculating an optimal route and alternative routes by way of, for example, neighborhood searching along the optimal route and running "what if?" queries to simulate various possible scenarios whereby the vehicle 10 departs the optimal route. The route is calculated at a set frequency and broadcast for use in controlling, via the autonomous driving system 70, the autonomous vehicle 10 in moving the vehicle 10 to the destination. For example, the route solution data 122 calculated in step 402 is sent to the vehicle control system 80 to define a path along which the vehicle 10 is controlled to move. In embodiments, step 402 is run at a set repetition frequency as part of a main thread of operation of the router 106.

Method 400 includes a step 404 of deciding whether remote assistance is desired. Step 404 is performed by the blockage arbiter 108 based on blockage data 116 received from various systems of the autonomous driving system 70 such as the computer vision system 74, the positioning system 76, the sensor system 28, the guidance system 78 and the vehicle control system 80. Various possible blockage scenarios that would lead to a decision that remote assistance is desired have been described above. For example, unexpected positioning of road markings as perceived by the computer vision system 74, a road construction/maintenance site being perceived by the computer vision system 74 or the vehicle not moving for a certain amount of time as perceived, for example, by the positioning system 76. Should remote assistance not be desired, the method 400 returns to step 402 of calculating the route to the destination. Should remote assistance be desired, the vehicle system 104 connects to the remote vehicle assistance system 102 to receive remote assistance. A variety of remote assistance actions are possible, as have been described in the foregoing. The present description of method 400 concentrates on blacklisting one or more road segments.

Method 400 includes a step 406 of determining which road segment(s) is (are) permitted to be blacklisted. Step 406 is performed through the permitted blacklist determination module 128 in response to remote assistance decision data 136 from the blockage arbiter 108 that is produced in step 404. Step 406 includes, in various embodiments, analyzing the route solution data 122 from the route calculation unit 120 that is produced in step 402. The analysis includes, in embodiments, determining road segments that may be removed whilst still leaving at least one route to the destination available as defined in the route solution data 122. Step 406 generates a list of road segments that are permitted to be blacklisted and embodies that list in permitted blacklist data 112.

Method 400 includes a step 408 of transmitting the route solution data 122 from step 402 and transmitting the permitted blacklist data 112 from step 406 from the vehicle system 104 to the remote vehicle assistance system 102. In embodiments, the transmissions take place over a cellular network via vehicle communications module 114 and remote communications module 158.

Method 400 includes a step 410 of selecting one or more road segments for blacklisting from the list of road segments that are permitted to be blacklisted as defined by the blacklist data 162. Step 410 is generally performed by a human operator analyzing the vehicle's environment from sensor system data transmitted to the remote vehicle assistance system 102, analyzing one or more route solutions defined in the route solution data 122 and selecting one or more road segments to be blacklisted using the operator interface tool 156. Analyzing the data involves, in some embodiments, a display of one or more route solutions and a display of imaging from the vehicle's environment in addition to an indication of road segments that are permitted to be blacklisted. The display is presented on the display device 154. In another embodiment, the AI expert 140 assists or separately selects the road segment(s) to be blacklisted. The human operator and/or the AI expert 140 selects the road segments with a view to removing the cause of blockage resulting in the blockage arbiter 108 deciding to enter the remote assistance mode.

Method 400 includes a step 412 of transmitting blacklist data 162 defining selected road segment(s) that is (are) blacklisted from the remote vehicle assistance system 102 to the vehicle system 104, via the communications modules 114, 158. The blacklist data 16 is received by the road map data builder 124 for building updated road map data in step 414. Step 414 includes excluding blacklisted road segments, as defined by the blacklist data 162, from old road map data 118 to arrive at the updated road map data 126.

Step 414 is performed in a background thread so that step 402 of calculating route solution data 122 continues to operate in the main thread based on the old map data 118. However, the route solution data 122 is marked as dirty data when it is broadcast during the road map data updating step being performed in the background. Once step 414 is complete and the old road map data 118 has been updated based on the permitted blacklist data 162, and various caches have been refreshed with the new information, the route solution data 122 is calculated in step 402 based on the updated road map data 126. The route solution data 122 is marked as clean data when it occurs after completion of updating step 414.

Although steps 402 to 414 are illustrated as occurring sequentially, it will be appreciated from the foregoing that some of the steps are performed in parallel. For example, step 402 of calculating the route to the destination is performed repeatedly at a predetermined frequency and is broadcast to, for example, the vehicle control system 80 through background processes such as updating road map data in step 414. Similarly, step 402 can run parallel to one or more of steps 406 to 412.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A vehicle system, comprising:
a router configured to, by a processor, access road map data and to calculate at least one route to a destination based on the road map data, thereby producing route solution data;
the router configured to, by the processor, receive remote assistance decision data and to responsively enter a remote assistance mode;
in the remote assistance mode, the router is configured to, by the processor, determine at least one road segment of the road map data that is permitted to be blacklisted, thereby producing permitted blacklist data, and to limit a distance of the at least one road segment from the vehicle system in determining the at least one road segment of the road map data that is permitted to be blacklisted; and
a vehicle communications module configured to transmit the permitted blacklist data and the route solution data to a remote vehicle assistance system.

2. The vehicle system of claim 1, wherein the vehicle communications module is configured to receive blacklist data representing at least one blacklisted road segment from the remote vehicle assistance system.

3. The vehicle system of claim 2, wherein the router is configured to update the road map data to exclude the at least one blacklisted road segment.

4. The vehicle system of claim 3, wherein the router is configured to recalculate the at least one route to the destination based on the updated road map data, thereby producing updated route solution data.

5. The vehicle system of claim 1, wherein the router is configured to provide the route solution data to an autonomous driving system.

6. The vehicle system of claim 1, comprising a blockage arbiter configured to receive inputs from at least one of a positioning system and a computer vision system and to determine a remote assistance requirement, thereby producing the remote assistance decision data.

7. The vehicle system of claim 1, wherein the road map data is provided as a graph data structure and the router is configured to calculate the at least one route to the destination based on the graph data structure using a graph traversal algorithm.

8. The vehicle system of claim 1 and an autonomous driving system configured to determine autonomous driving commands for directing the vehicle to the destination based on the route solution data; and
an actuator system configured to automatically control components of the vehicle so that the vehicle autonomously moves along the at least one route to the destination.

9. A remote vehicle assistance system, comprising:
a remote communications module configured to receive permitted blacklist data and route solution data from a vehicle system, the permitted blacklist data including at least one road segment of road map data that is permitted to be blacklisted and that is determined based on a distance limit associated with the at least one road segment and the route solution data representing at least one route to a target destination; and
a vehicle assistance tool configured to select at least one road segment from the permitted blacklist data to be blacklisted, thereby producing blacklist data;
the remote communications module configured to transmit the blacklist data to the vehicle system.

10. The remote vehicle assistance system of claim 9, wherein the remote vehicle system comprises an operator interface tool configured to receive a human operator input as to the at least one road segment from the permitted blacklist data to be blacklisted.

11. The remote vehicle assistance system of claim 9, comprising a display and configured to display the at least one route to the target destination and to indicate the at least one road segment that is permitted to be blacklisted.

12. The remote vehicle assistance system of claim 9 and a vehicle system, comprising: a router configured to access the road map data and to calculate the at least one route to the target destination based on the road map data, thereby producing the route solution data; the router configured to receive remote assistance decision data and to responsively enter a remote assistance mode; in the remote assistance mode, the router is configured to determine at least one road segment of the road map data that is permitted to be blacklisted, thereby producing the permitted blacklist data; and a vehicle communications module configured to transmit the permitted blacklist data and the route solution data to the remote assistance system.

13. A computer implemented method of providing remote assistance to an autonomous vehicle comprising a vehicle system, the method comprising:
calculating, via a router of the vehicle system that accesses road map data, at least one route to a destination based on the road map data, thereby producing route solution data;
the vehicle system entering a remote assistance mode in response to remote assistance decision data received from a blockage arbiter of the vehicle system;
in the remote assistance mode, determining, via the router, at least one road segment of the road map data that is permitted to be blacklisted, thereby producing permitted blacklist data,
limiting a distance of the at least one road segment from the vehicle system in determining the at least one road segment of the road map data that is permitted to be blacklisted, and
transmitting the permitted blacklist data and the route solution data, via a vehicle communications module of the vehicle system, to a remote vehicle assistance system.

14. The computer implemented method of claim 13, comprising receiving blacklist data, via the vehicle communications module, representing at least one blacklisted road segment from the remote vehicle assistance system.

15. The computer implemented method of claim 14, comprising updating, via the router, the road map data to exclude the at least one blacklisted road segment.

16. The computer implemented method of claim 15, comprising recalculating the at least one route to the destination based on the updated road map data, thereby produced updated route solution data.

17. The computer implemented method of claim 13, wherein the road map data is provided as a graph data structure.

18. The computer implemented method of claim 13, comprising the remote vehicle assistance system receiving, via a remote communications module, the permitted blacklist data and the route solution data from the vehicle system, and selecting, via a vehicle assistance tool, at least one road segment from the permitted blacklist data to be blacklisted, thereby producing the blacklist data; and transmitting the blacklist data to the vehicle system via the remote communications module.

19. The computer implemented method of claim 13, controlling, via an autonomous driving and actuator system, components of the vehicle so that the vehicle autonomously moves along the at least one route to the destination.

* * * * *